United States Patent
Miyazaki et al.

(10) Patent No.: US 7,158,942 B2
(45) Date of Patent: Jan. 2, 2007

(54) INTERNET ADVERTISEMENT SYSTEM

(75) Inventors: Jun Miyazaki, Kanagawa (JP);
Fumitaka Okamoto, Tokyo (JP)

(73) Assignee: YYY Net Co., Ltd., Tokyo (JP)

( * ) Notice: Subject to any disclaimer, the term of this patent is extended or adjusted under 35 U.S.C. 154(b) by 1250 days.

(21) Appl. No.: 09/891,295

(22) Filed: Jun. 27, 2001

(65) Prior Publication Data

US 2002/0013785 A1    Jan. 31, 2002

(30) Foreign Application Priority Data

Jun. 27, 2000    (JP)    ............................. 2000-192510

(51) Int. Cl.
*G06F 17/60*    (2006.01)
(52) U.S. Cl. ........................ 705/14; 235/492
(58) Field of Classification Search ............... 705/14; 235/492

See application file for complete search history.

(56) References Cited

U.S. PATENT DOCUMENTS 6,607,136 B1 *    8/2003    Atsmon et al. ............. 235/492

2001/0005855 A1 *    6/2001    Shaw et al. ................. 709/206

FOREIGN PATENT DOCUMENTS

| JP | 2000-194636 | 7/2000 |
| JP | 2001-43241 | 2/2001 |
| JP | 2001-134650 | 5/2001 |
| JP | 2001-147870 | 5/2001 |
| WO | WO 009624213 | * 8/1996 |

OTHER PUBLICATIONS

Williamson, "This E-mail Message is Brought to You by . . . ," Advertising Age, v66, n 16, Apr. 17, 1995, p. 16; discusses e-mail transmission.*

* cited by examiner

*Primary Examiner*—John Leonard Young
(74) *Attorney, Agent, or Firm*—Wenderoth, Lind & Ponack, L.L.P.

(57) ABSTRACT

An Internet advertisement system which utilizes an advertisement server site and at least one partner web site. The partner web site provides to end-user terminals by e-mail a web page on which one or more banners that are provided from an advertisement server site are inserted. When a user clicks a browsed banner, content that is linked to the clicked-on banner is retrieved from a content database and delivered to the user by e-mail.

8 Claims, 4 Drawing Sheets

INTERNET ADVERTISEMENT SYSTEM

BACKGROUND OF THE INVENTION

1. Field of the Invention

The present invention relates generally to a technique for delivering advertisements through the Internet to users, and more particularly, to an advertisement system on the Internet wherein detailed advertisement information associated with advertisement banners can be delivered to users easily and unobtrusively by e-mail.

2. Description of the Related Art

A variety of web pages on the Internet now carry advertisement banners. When an end-user clicks on an advertisement banner on a web page, the end-user terminal is connected to a server hosting the web page of the advertiser which owns the banner, and the server then enables an end-user to view a copy of the page that is linked to the banner at the end-user's terminal. Although an end-user simply needs to click on an advertisement banner to receive advertisement banner-linked contents, there inevitably will be times when an end-user is unable to follow such a link and view an advertiser's page. Not only is it time consuming to follow a link to a page and then view the contents, it is also intrusive for a viewer. Consequently, certain situations will preclude an end-user from following a banner link, such as participation in a chat room, participation at a game site, computer use at the workplace, and so on. Thus, although an end-user may wish to view a page that is linked to an advertisement banner, the end-user may be constrained from doing so. Such constraints represent a potential loss of business for the owners of advertisement banners. In addition, there will always be a case when an end-user, although not constrained from viewing an advertisement banner linked page, would rather not do so at the time the banner appears, preferring to delay such activity until some later time.

Conventional advertisement systems that are employed on the Internet, however, are unable to cater to the needs of users who are either constrained from viewing or disinclined to view advertisement banner-linked contents at the time an advertisement banner appears.

SUMMARY OF THE INVENTION

The present invention has been accomplished in order to overcome the above-described problems of the prior art. Namely, it is an object of the present invention to provide an Internet advertisement system which will enable an end-user to acquire advertisement banner-linked contents unobtrusively by using a single click operation, and to then view such contents at the end-user's leisure at some later time as desired. To achieve this object, the present invention provides an advertisement system on the Internet consisting of an advertisement server site, and at least one partner web site which provides a web page on the Internet and contains e-mail addresses of affiliate users, the advertisement server site comprising:

(a) a first database for storing advertisement banners with respective identifications of the advertisement banners;

(b) a second database for storing detailed advertisement contents each having the same identification as the identification of one of the advertisement banners stored in the first database so that the advertisement contents are associated (linked) with the advertisement banners, respectively;

(c) means for providing the partner web site with at least one advertisement banner that is stored in the first database, the advertisement banner being carried on the web page that is provided by the partner web site;

(d) means for receiving an identification of the advertisement banner and an e-mail address of a user from the partner web site when the web page of the partner web site is browsed on a terminal of the user and the advertisement banner thereon is clicked; and (e) means for retrieving an advertisement content having the same identification as the received identification of the advertisement banner, and delivering the advertisement content to the user terminal with the received e-mail address by e-mail.

Therefore, the system according to the present invention makes it possible to include an advertisement banner in an e-mail that is delivered from a partner web site rather than simply carrying the banner on a web page.

The present invention further provides an advertisement system on the Internet including an advertisement server site and at least one partner web site which provides a web page on the Internet, the advertisement server site comprising:

(a) a first database for storing advertisement banners with respective AD identifications;

(b) a second database for storing detailed advertisement contents each having the same AD identification as the AD identification of one of the advertisement banners stored in the first database so that the advertisement contents are associated (linked) with the advertisement banners, respectively;

(c) a third database for storing end-user information including e-mail addresses of users;

(d) means for providing the partner web site with at least one advertisement banner that is stored in the first database, the advertisement banner being carried on the web page of the partner web site;

(e) determining means for determining whether an e-mail address of an end-user has been stored in the third database when the end-user accesses the web page of the partner web site;

(f) means for receiving the AD identification of the banner and an identification of the end-user from the partner web site upon the end-user clicking the banner in the web page that is browsed at the end-user terminal when the determining means determines that the e-mail address of the end-user has been registered in the third database;

(g) means, for receiving a vacant e-mail from the end-user terminal upon the end-user clicking the banner in the web page that is browsed on the end-user terminal when the determining means determines that an e-mail address of the end-user has not been registered in the third database, and for storing an e-mail address with the end-user identification stored in the third database, wherein the vacant e-mail contains the AD identification of the advertisement banner and a unique user identification that is allocated to the end-user which are embedded in the advertisement banner together with a mailto: tag that is indicative of the e-mail address of the advertisement server site; and (h) means for retrieving an advertisement content having the received AD ID from the second database and an e-mail address having the user ID from the third database, and for delivering the content through the Internet to the end-user terminal having the retrieved e-mail address.

DETAILED DESCRIPTION OF THE INVENTION

Figure 1:
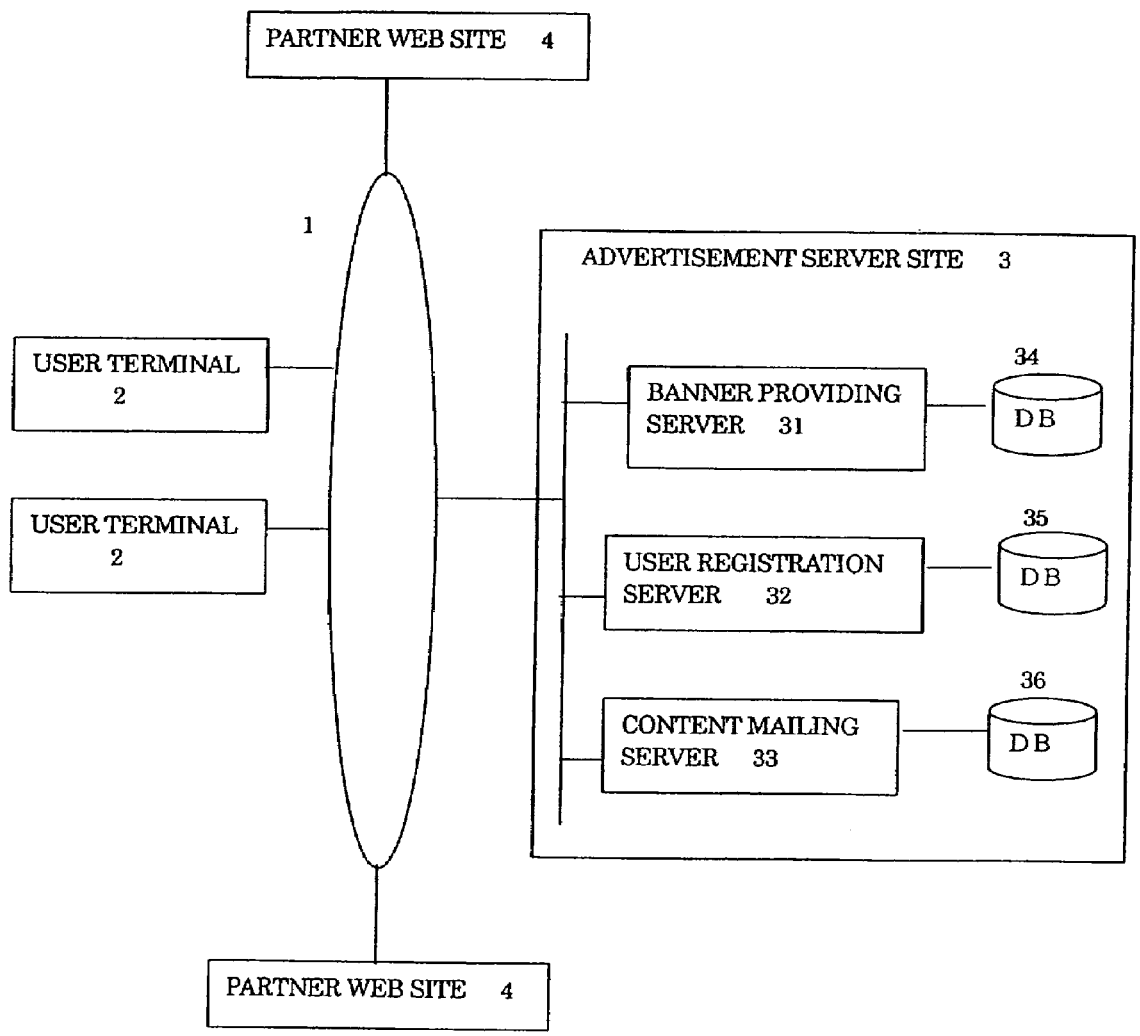
FIG. 1 is a block diagram explaining a general configuration of an advertisement system on the Internet according to the present invention.

FIG. 1 is a block diagram showing an advertisement system on the Internet according to the present invention. The advertisement system comprises an advertisement server site 3 and web sites 4 which are partners of the advertisement server site 3. The advertisement server site 3 includes an advertisement banner providing server 31 for providing the partner web sites 4 with advertisement banners which are each comprised of a GIF image or the like, a user registration server 32 for receiving end-user information including at least e-mail addresses of end-users and storing the end-user information in the advertisement server site 3, and a content mailing server 33 for delivering advertisement banner-linked contents to end-user terminals 2 by e-mail. Each of the end-user terminals 2 may be a personal computer or a mobile phone that is connectable to the Internet 1.

The advertisement server site 3 also comprises an advertisement banner database 34 that is connected to the banner providing server 31, an end-user database 35 that is connected to the end-user registration server 32, and an advertisement content database 36 that is connected to the content mailing server 33.

The advertisement banner database 34 stores the advertisement banners of GIF images or the like together with advertisement identifications (AD IDs), which are read out therefrom by the banner providing server 31 and transferred to the partner web sites 4. The end-user database 35 registers, as end-user information, "e-mail address" of each end-user, and if possible, "user name", "end-user registration date", "sex," "age," "hobby," "number of banner click times" and similar identification information of the end-user. The end-user information is generally obtained from the partner web sites 4 which usually have obtained the end-user information as affiliate end-user information. The content database 36 stores advertisement banner-linked contents corresponding to the respective advertisement banners in the banner database 34. The advertisement banner and its linked contents are provided with the same AD ID. The advertisement banner-linked contents may be text information, image information, or a combination of text information and image information.

The partner web sites 4 may be net-game service sites, chat room service sites and/or E-commerce sites having web-page-providing functions, although the partner web sites 4 are not intended to be restricted to these types of sites. Each of the partner web sites 4 receives some of the previously contracted advertisement banners that are read out from the banner database 34 by the banner providing server 31, and places the advertisement banners on their web pages. It is also possible to carry the banner on an e-mail to be transmitted from a mail server which may be included in the designated partner web sites 4.

Figure 2:
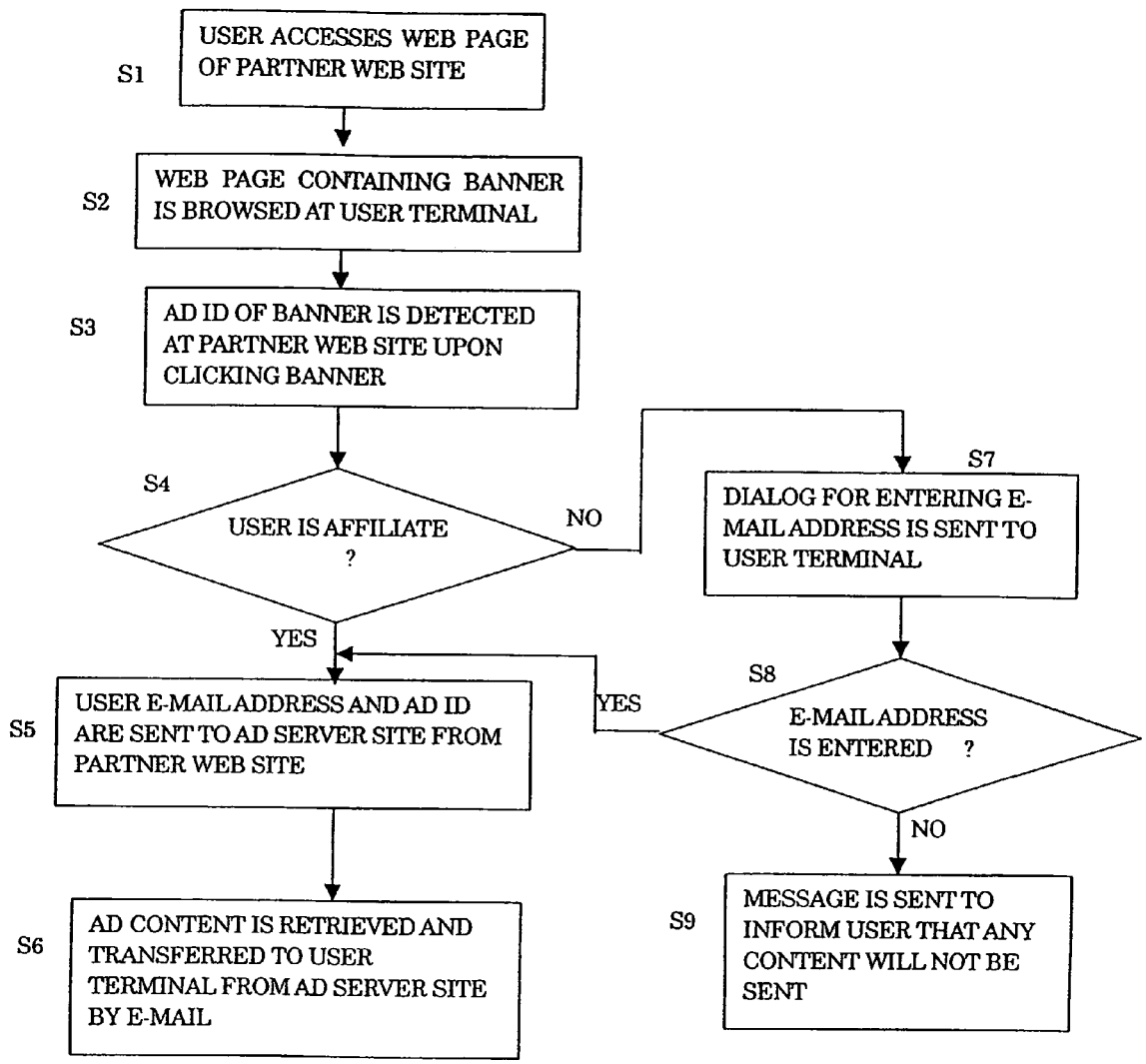
FIG. 2 is a flowchart explaining an operation of a first embodiment of the advertisement system illustrated in FIG. 1.

Now, a more detailed configuration of the advertisement system illustrated in FIG. 1 will be clarified by explaining an operation thereof with reference to the flowchart shown in FIG. 2.

The procedure starts in Step S1 with an end-user accessing a particular partner web site 4 which hosts, for example, a net-game web page. At least one advertisement banner that is provided from the advertisement server site 3 is carried (located) on the net-game web page. Then, in Step S2 the net-game web page is browsed at the end-user terminal 2. While playing the net-game, the end-user directs his/her attention to the advertisement banner appearing at the end-user terminal 2, and clicks the banner in at Step S3, thereby causing an AD ID that is embedded in the clicked banner to be transmitted to the partner web site 4. Then, it is determined in Step S4 whether the player is an affiliate of the partner web site 4 and thus whether the partner web site 4 has obtained his/her information containing at least his/her e-mail address. If so, in Step S5, the partner web site 4 transfers the end-user information as well as the received AD ID to the advertisement server site 3.

In the advertisement server site 3, the end-user information is registered or updated in the end-user database 35 by the end-user registration server 32, and thereafter, the end-user information and the AD ID of the clicked banner are transferred to the content mailing server 33. In step S6, the content mailing server 33 reads from the content database 37, obtains the advertisement banner-linked content having the same AD ID as the AD ID that was received, and delivers the advertisement-linked content through the Internet 1 to the end-user terminal 2 having the received e-mail address. The advertisement banner-linked content may be sent as an appendix (attachment) to an e-mail or in the actual e-mail text. Thus, advertisement banner-linked content can be delivered to the end-user by e-mail. In this way, an end-user is able to obtain an advertisement banner-linked content by a single click operation while enjoying an uninterrupted game. The AD ID of the clicked banner can also be stored in the end-user database 35 so as to build an information base of an end-user's interests and preferences.

On the other hand, if it is determined in Step S4 that the end-user is not an affiliate of the partner web site 4 (which means that the partner web site 4 has not obtained an e-mail address of the end-user), the partner web site 4, in Step S7, sends a dialog to the end-user terminal 2 requesting the end-user to enter his or her e-mail address. If it is determined in Step S8 that the end-user enters his or her e-mail address, the procedure goes from Step S8 to Step S5. If the end-user does not wish to enter his or her e-mail address, the partner web site 4, in Step S9 sends a message to the end-user terminal 2 that no advertisement banner-linked content will be sent.

When a partner web site 4 provides a web page on which only affiliate end-users can, for example, enjoy a game or the like, the web site 4 usually has information including the e-mail addresses of the affiliate end-users. Therefore, the advertisement server site 3 can easily obtain an e-mail address of an end-user who has clicked on a banner on the web page from the partner web site 4. The same is true in a case where one or more advertisement banners are carried on e-mails which are sent to user terminals 2 from partner web sites 4, because the e-mail addresses of the end-users have been registered in the web sites 4.

In this way, an end-user can view advertisement banner-linked content at his or her leisure at a later time.

Figure 3:
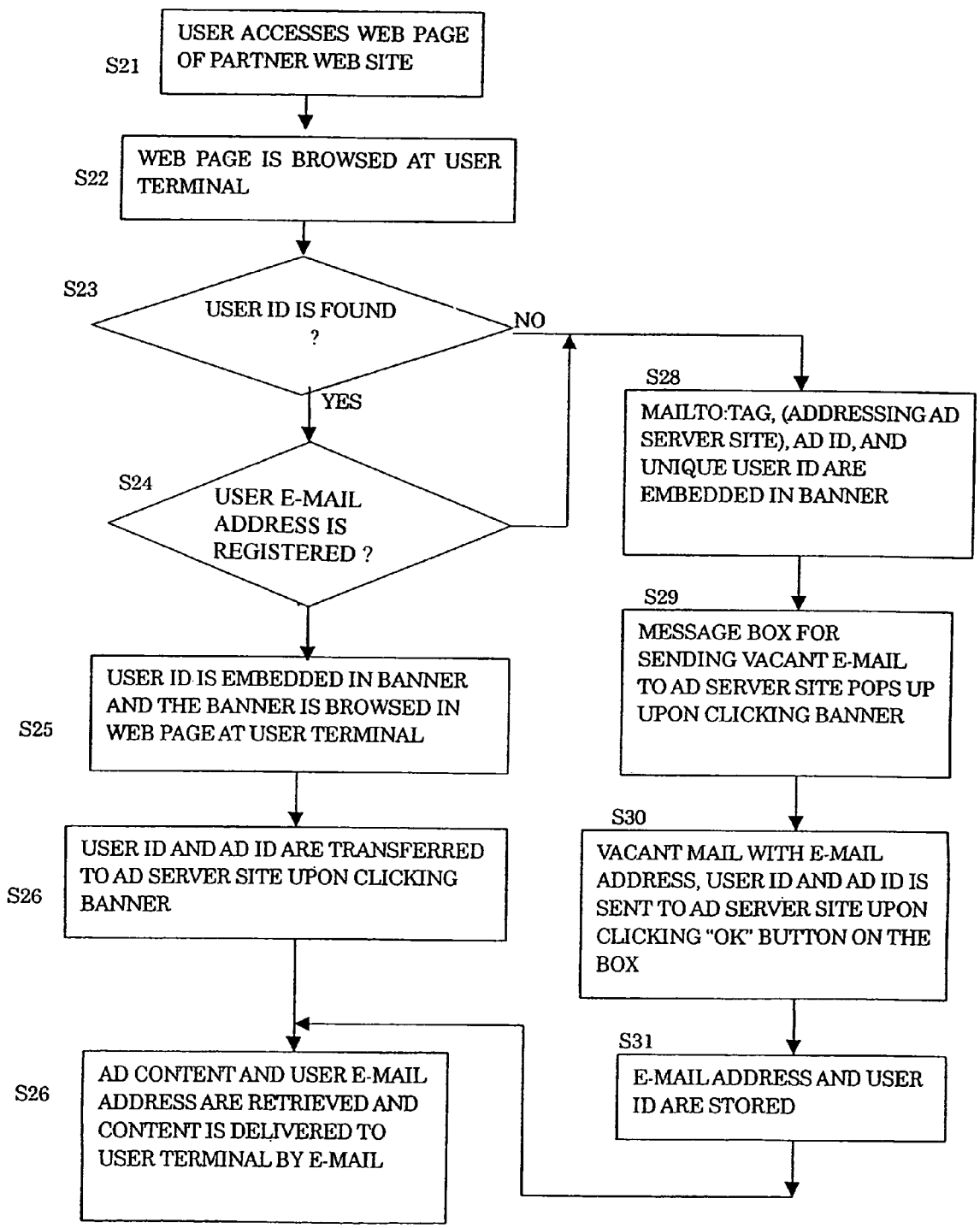
FIG. 3 is a flowchart explaining an operation of a second embodiment of the advertisement system illustrated in FIG. 1.

FIG. 3 is a flowchart illustrating another example of a procedure of the advertisement system according to the present invention. In Step S21, an end-user accesses a web page of a partner web site 4, and the page is browsed at the end-user terminal 2 in Step S22. Then, in Step S23, the partner web site 4 searches for an identification of the end-user. The search may be executed by determining whether a cookie or a unique number functioning as the end-user ID has been allocated to the end-user terminal, and if so, by determining whether the end-user ID has been registered. If an identification of the end-user ID is found in Step S23, the procedure goes to Step S24 where the partner web site 4 inquires of the advertisement server site 3, by using the end-user ID, whether end-user information including an e-mail address has been registered in the end-user database 35.

If the end-user information has been registered in the end-user database 35, the partner web site 4 embeds the end-user ID in at least one banner, which in turn is displayed on the web page in Step S25. When the banner is clicked on by the end-user, the embedded end-user ID and AD ID are transferred to the advertisement server site 3 in Step S26. Then in Step S27, an e-mail address and advertisement banner-linked content are retrieved from the end-user database 35 and the advertisement content database 36, respectively by using the received end-user ID and AD ID, and the banner-linked content is delivered to the end-user terminal by e-mail.

On the other hand, if neither the end-user ID nor end-user information (or e-mail address) is found in Steps S23 and S24, the procedure goes to Step S28 where the partner web site 4 embeds a "from tag" including a "mailto: tag" for sending a vacant e-mail and a "unique ID" that is allocated to the end-user into at least one banner. Then, the banner is inserted in the web page and browsed at the end-user terminal 2. The "from tag" can be written as follows, for instance:

```
<form method="post" action="mailto:xxxx@(AD server)">
    <input type=hidden name="subject" value="AD ID-END-USER ID">
    <input type=image src="BANNER.gif">
</form>
```

As will be apparent from the above, the from tag also contains the AD ID of the banner. The partner web site 4 further sends the end-user ID as a cookie to the end-user terminal 2.

Figure 4:
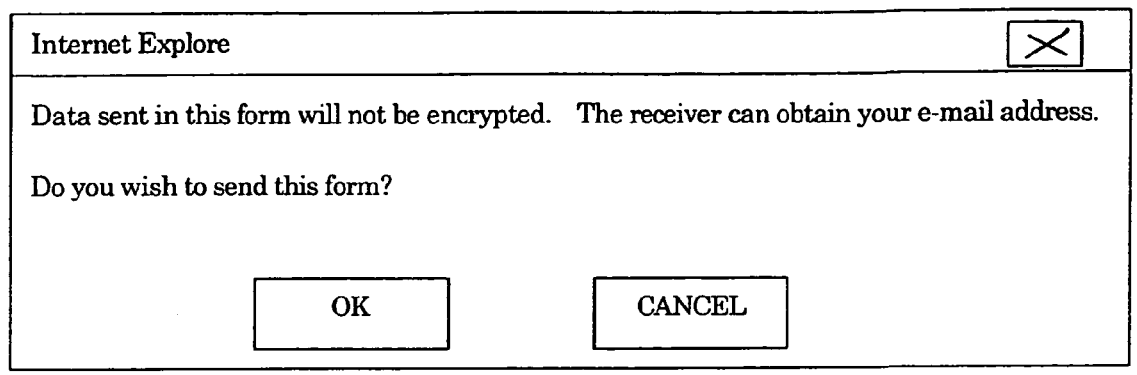
FIG. 4 is a diagram illustrating a message box or message dialog for sending a vacant e-mail which pops up when an advertisement banner is clicked.

Subsequently, in step S29, a message box as shown in FIG. 4 pops up when an end-user clicks on the banner. If the end-user then clicks on an "OK" button which appears on the message box, a vacant e-mail with the end-user's e-mail address, the end-user's ID and the AD ID are sent to the advertisement server site 3 in Step S30. The e-mail address of the end-user is stored in the end-user database 35, together with the user ID at Step S31, and as a result, the email address is retrievable with the user ID. Therefore, in Step S26, the content mailing server 33 can deliver advertisement banner-linked content to the end-user terminal 2 by e-mail.

Thus, after an e-mail address together with a user ID is registered, an end-user can obtain advertisement banner-linked content by a single click operation.

The advertisement system of the present invention may be modified in various ways. For example, the advertisement banner providing server 31 may read a plurality of advertisement banners from the database 35 so as to simultaneously carry the plurality of advertisement banners on one web page of a partner web site 4, whereby the banners can be browsed simultaneously on a monitor screen of a user terminal 2. Alternatively, a set of different advertisement banners on a web page may be replaced after the elapse of predetermined time periods. In both cases, a user is able to click on two or more banners on a web page.

As described above, a personal computer or a mobile phone is employed as the user terminal 2. However, it should be noted that only mobile phones that are allocated unique user IDs by a partner web site 4 can be utilized as end-user terminals at present, because mobile phones are not currently provided with an individual identification function utilizing cookies. If this function is provided in mobile phones, mobile phones will be able to be utilized as user terminals 2 even though they are not assigned user IDs.

The advertisement system according to the present invention manifests itself as a significantly effective advertisement system both for users and advertisers, and also for partner web sites on which web pages that are linked to advertisement banners are carried.

To illustrate the significance of the present invention, it is estimated that the number of end-users who click on advertisement banners to access advertisement content-linked web pages is in the order of just 1% of total users in conventional advertisement systems on the Internet. This can be attributed to the difficulties of constraint and the circumstances as mentioned above in the summary section of this specification. The advertisement system according to the present invention allows an end-user to view detailed advertisement information or a banner-linked content both at their leisure and repeatedly since such advertisement information or banner-linked content is delivered by e-mail. In addition, such content can be obtained by e-mail by using a single click operation. Needless to say, a system which allows such convenient and unobtrusive delivery of advertising content will have a big impact on the number of sales for such content generators. In addition, at the most one click per visit is counted at the most for a partner web site, resulting in a relatively low cost per click (CPC) for the partner web site. However, when an end-user clicks on an advertisement banner on a web page of a partner web site, the end-user is not taken to the advertiser's web page in the system of the present invention, a plurality of advertisement banners can be browsed simultaneously at an end-user's terminal and all of the browsed banner-linked content can be downloaded conveniently by e-mail. Accordingly, each time an end-user clicks on a banner, the click can be counted, thereby leading to an increase in advertising revenue for the respective partner sites.

What is claimed is:

1. An advertisement system on the Internet, said advertisement system including an advertisement server site and at least one partner web site which provides a web page on the Internet and which contains e-mail addresses of affiliate users of said at least one partner web site, wherein said advertisement server site comprises:

a first database for storing a plurality of advertisement banners and a respective identification of each of the plurality of the advertisement banners;

a second database for storing detailed advertisement contents each having a same identification as the identification of one of the plurality of advertisement banners stored in said first database, respectively, so that the advertisement contents are linked with the advertisement banners, respectively;

advertisement banner providing means for providing said at least one partner web site with at least one advertisement banner among the plurality of advertisement banners stored in said first database, the at least one advertisement banner being carried on the web page provided by said at least one partner web site;

receiving means for receiving an identification of the at least one advertisement banner and an e-mail address of an end-user from the partner web site when the end-user browses the web page of the partner web site at a terminal of the end-user and clicks on the at least one advertisement banner; and retrieving means for retrieving advertisement content having the same identification as the identification received by said receiving means, and for delivering the retrieved advertisement content to the end-user terminal having the received e-mail address by e-mail.

2. An advertisement system according to claim 1, wherein said at least one partner web site is at least one of a net-game provider, a chat room provider, and an e-commerce provider.

3. An advertisement system according to claim 1, wherein said advertisement banner providing means is adapted to provide a plurality of advertisement banners to said at least one partner web site so as to be carried simultaneously on the web page.

4. An advertisement system according to claim 1, wherein said advertisement banner providing means is adapted to provide a plurality of sets of advertisement banners to said at least one partner web site so as to be carried on the web page and switched on the web page as a set at predetermined time periods.

5. An advertisement system on the Internet, said advertising system including an advertisement server site and at least one partner web site which provides a web page on the Internet, wherein said advertisement server site comprises:

a first database for storing a plurality of advertisement banners and a respective AD identification of each of the plurality of advertisement banners;

a second database for storing detailed advertisement contents each having a same AD identification as the AD identification of one of the plurality of advertisement banners stored in said first database, respectively, so that the advertisement contents are associated with the advertisement banners, respectively;

a third database for storing user information including e-mail addresses of end-users;

advertisement banner providing means for providing said at least one partner web site with at least one advertisement banner among the plurality of advertisement banners stored in said first database, the at least one advertisement banner being carried on the web page of said at least one partner web site;

determining means for determining whether an e-mail address of an end-user has been stored in said third database when the end-user accesses the web page of said at least one partner web site;

first receiving means for receiving the AD identification of the at least one advertisement banner provided by said advertisement banner providing means and an identification of the end-user from the partner web site when the end-user clicks on the at least one advertisement banner on the web page that is browsed at a terminal of the end-user and when said determining means determines that the e-mail address of the end-user has been registered in said third database;

second receiving means for receiving a vacant e-mail from the terminal of the end-user when the end-user clicks on the at least one advertisement banner on the web page that is browsed at the terminal of the end user and when said determining means determines that the e-mail address of the end-user has not been registered in said third database, and for storing an e-mail address with a unique user identification that is allocated to the end-user whose email has not been registered in said third database, wherein the vacant e-mail contains the AD identification of the at least one advertisement banner and the unique user identification, and the AD identification and the unique user identification are embedded in the at least one advertisement banner together with a mailto tag that is indicative of an e-mail address of said advertisement server site; and retrieving means for retrieving an advertisement content having the received AD identification from said second database and an e-mail address having the user identification from said third database, and for delivering the retrieved advertisement content to the terminal of the end-user with the retrieved e-mail address over the Internet by e-mail.

6. An advertisement system according to claim 5, wherein said at least one partner web site is at least one of a net-game provider, a chat room provider, and an e-commerce provider.

7. An advertisement system according to claim 5, wherein said advertisement banner providing means is adapted to provide a plurality of advertisement banners to said at least one partner web site so as to be carried simultaneously on the web page.

8. An advertisement system according to claim 5, wherein said advertisement banner providing means is adapted to provide a plurality of sets of advertisement banners to said at least one partner web site so as to be carried on the web page and switched on the web page as a set at predetermined time periods.

* * * * *